United States Patent [19]

Denz et al.

[11] Patent Number: 5,741,958
[45] Date of Patent: Apr. 21, 1998

[54] METHOD FOR DETECTING AND DOCUMENTING EXHAUST-GAS RELEVANT MALFUNCTIONS OF A MOTOR VEHICLE HAVING AN INTERNAL COMBUSTION ENGINE WITH THE AID OF ON-BOARD MEANS

[75] Inventors: Helmut Denz, Stuttgart; Andreas Blumenstock, Ludwigsburg, both of Germany

[73] Assignee: Robert Bosch GmbH, Stuttgart, Germany

[21] Appl. No.: 757,772

[22] Filed: Nov. 27, 1996

[30] Foreign Application Priority Data

Dec. 23, 1995 [DE] Germany .................. 195 48 684.6

[51] Int. Cl.$^6$ .................................................. G01M 15/00
[52] U.S. Cl. .................. 73/23.32; 73/117.3; 73/118.1
[58] Field of Search .................... 73/116, 117.2, 73/117.3, 118.1, 118.2, 23.31, 23.32; 364/431.051, 431.062

[56] References Cited

U.S. PATENT DOCUMENTS

| | | | |
|---|---|---|---|
| 4,372,155 | 2/1983 | Butler et al. | 73/23.32 |
| 5,158,059 | 10/1992 | Kuroda | 123/690 |
| 5,263,453 | 11/1993 | Wakahara et al. | 123/436 |
| 5,440,922 | 8/1995 | Ichikawa | 73/117.3 |
| 5,567,873 | 10/1996 | Toyoda | 73/117.3 |

*Primary Examiner*—George M. Dombroske
*Attorney, Agent, or Firm*—Walter Ottesen

[57] ABSTRACT

The invention is directed to a method for detecting and documenting exhaust-gas relevant malfunctions of a vehicle having an internal combustion engine and a fuel tank utilizing on-board diagnosis. In the method, malfunctions are detected utilizing a sensor device and the malfunctions are evaluated in a circuit unit with the malfunctions including those malfunctions which are based on an empty tank. The fault announcements of the malfunctions are stored in a memory in dependence upon a pregiven number of drive cycles. A fill-level value indicative of the level of fuel in the fuel tank is determined and stored in the memory. Fault announcements of the malfunctions are outputted and stored in the memory in dependence upon the fill-level value thereby eliminating fault announcements of the malfunctions based on an empty tank.

7 Claims, 1 Drawing Sheet

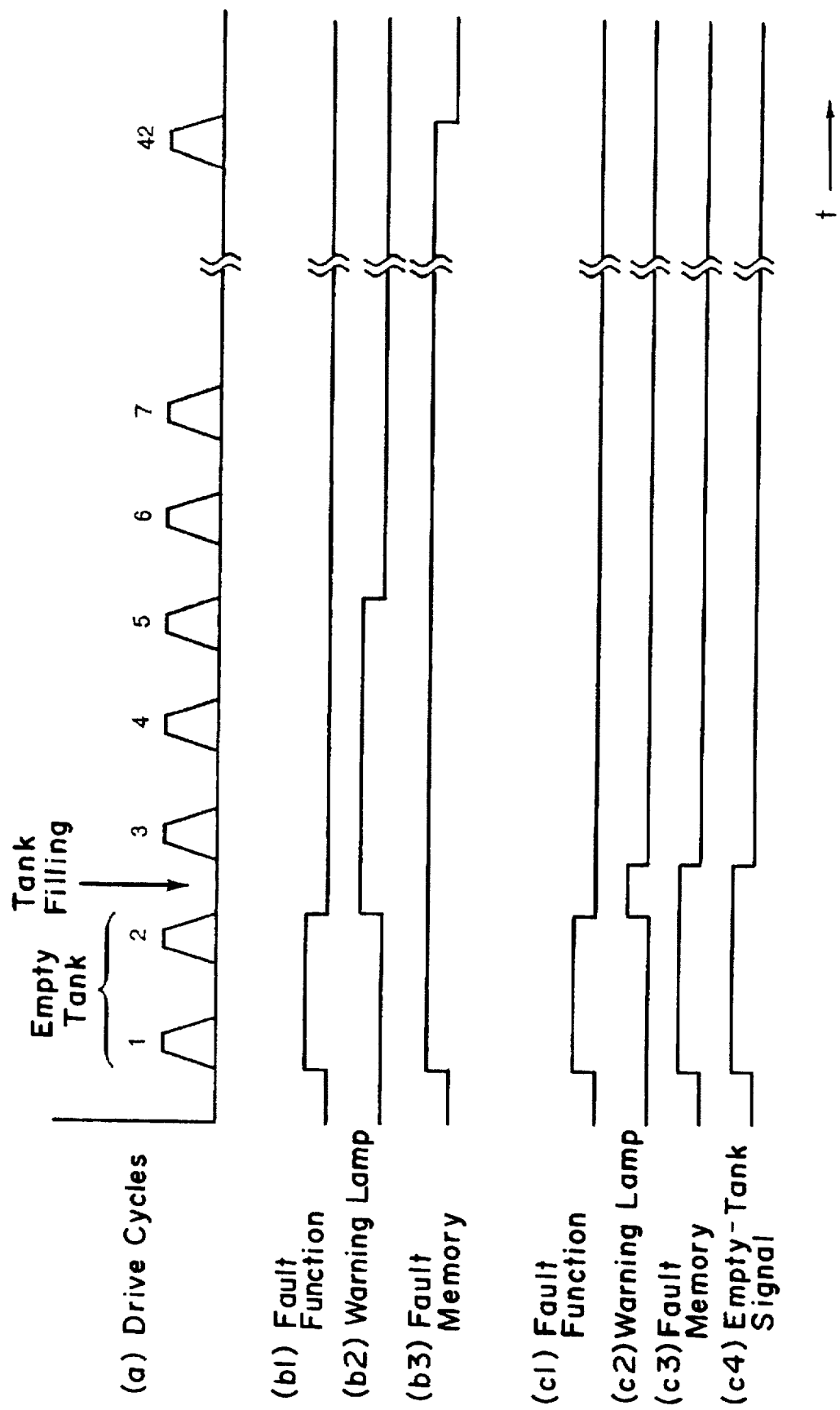

METHOD FOR DETECTING AND DOCUMENTING EXHAUST-GAS RELEVANT MALFUNCTIONS OF A MOTOR VEHICLE HAVING AN INTERNAL COMBUSTION ENGINE WITH THE AID OF ON-BOARD MEANS

BACKGROUND OF THE INVENTION

The California Environmental Authority (CARB) has, since 1993, required the detection and documentation of exhaust-gas relevant malfunctions of a motor vehicle equipped with an internal combustion engine with the aid of on-board diagnosis.

It is known to detect malfunctions by sensor means and to evaluate the same in a circuit unit. The malfunctions are then displayed by a warning lamp (malfunction indicator lamp) mounted in the viewing region of the driver. The driver is then requested to make a visit to a service facility because of this fault announcement. At the same time, a malfunction detected in this manner is stored in an electronic fault memory.

The warning lamp must only be switched on when the fault is detected in two sequential drive cycles and can only be extinguished when the fault no longer occurs in three successive drive cycles. The fault memory can only be extinguished after 40 drive cycles in which the fault no longer occurred.

The detection and documentation of malfunctions, which are caused by a deficiency in fuel, are problematical. The fuel pump, for example, sporadically pumps vapor instead of liquid when the tank goes to empty. The necessary metering of fuel to one or several cylinders of the engine of the vehicle drops off so greatly that combustion misfires occur. The uncombusted fuel is then combusted with oxygen in the catalytic converter whereby the temperature of the catalytic converter increases so significantly that permanent damage can occur to the catalytic converter.

Furthermore, when the tank is empty, mixture deviations can occur which cause the exhaust gas to deteriorate. Such malfunctions are no longer present after tanking since, in this case, adequate fuel is available. It is now disadvantageous that even in such cases, the warning lamp is switched on and the driver is thereby instructed to make an unnecessary visit to a service facility. The service personnel can however not locate a fault because this only occurred when the tank was empty.

To counter this problem, U.S. Pat. No. 5,158,059 discloses a method wherein the detection of malfunctions is suppressed when the tank is empty. The disadvantage here is that, by not displaying the fault announcement, the driver is not warned as to malfunctions such as ignition misfires which could lead to damage of the catalytic converter.

SUMMARY OF THE INVENTION

In view of the above, it is an object of the invention to provide a method for detecting and documenting exhaust-gas relevant malfunctions of a vehicle having an internal combustion engine with the aid of on-board diagnosis of the kind described above which eliminates the above-mentioned disadvantages and makes it possible to always detect malfunctions but to only display them continuously and store the same when they are based on a technical defect of the vehicle which is actually present and not on a tank which is temporarily empty. Stated otherwise, it is an object of the invention to eliminate erroneous fault announcements which are based on a tank driven to empty compared to fault announcements which are based on a technical defect, that is, to eliminate the first-mentioned fault announcements.

The method of the invention is for detecting and documenting exhaust-gas relevant malfunctions of a vehicle having an internal combustion engine and a fuel tank utilizing on-board diagnosis. The method includes the steps of: detecting malfunctions utilizing sensor means and evaluating the malfunctions in a circuit unit with the malfunctions including those malfunctions which are based on an empty tank; storing fault announcements of the malfunctions in a memory in dependence upon a pregiven number of drive cycles; determining a fill-level value indicative of the level of fuel in the fuel tank and storing the fill-level value in the memory; and, outputting and storing fault announcements of the malfunctions in the memory in dependence upon the fill-level value thereby eliminating fault announcements of the malfunctions based on an empty tank.

It is especially advantageous that a fill-level determination of the fuel tank is made and the specific fill-level value is stored at the same time as the exhaust-gas relevant malfunctions of a motor vehicle with an internal combustion engine are detected and documented. This detection and documentation is made with the aid of on-board means. In this way, a detected stored malfunction can be set into relationship to the fill-level value of the fuel tank. In this manner, an output as well as a storage of the fault announcement is undertaken by the circuit unit in dependence upon the fill-level value of the fuel tank so that a fault announcement is only continuously outputted and stored when it is based on a technical defect but not on a tank driven to empty.

It is also, for example, advantageous that ignition misfires and/or disturbances in the fuel supply system are detected as malfunctions and are displayed and stored. Malfunctions of this kind (for example, ignition misfires but also mixture deviations caused by an empty tank) can, as mentioned above, lead to damage of the exhaust-gas system and especially of the catalytic converter.

It is also especially advantageous that each fault announcement occurring in a drive cycle is directly outputted and is stored together with the fill-level value and that the output of the fault announcement is only ended in a further drive cycle and the storage is erased when the fill-level value of the fuel tank exceeds a pregiven value in the further drive cycle and when this value has dropped below the pregiven value in the drive cycle which directly preceded the further drive cycle. In this way, it is ensured that, on the one hand, every detected fault announcement is also outputted and stored and, on the other hand, a fault announcement, which has been outputted and stored and is based on a tank driven to empty, is, to an extent, corrected by the detection of the fill level of the fuel tank in that the output of the fault announcement is ended as well as that the storage of the fault announcement is erased. This makes possible, in a simple manner, to differentiate between a fault announcement, which is based on an actually present technical defect, and a fault announcement which is based only on a tank driven to empty.

Preferably, the fill-level determination is made via a fill-level sensor.

It is also possible to determine the fill level by detecting deviations in mixture.

Finally, the fill level can also be determined in a manner known per se by charging the fuel tank with a pressure and detecting the trace of the pressure change which results subsequently thereto.

Further decision criteria for differentiating technically caused malfunctions from malfunctions which are caused by a tank driven to empty are made possible in addition to the determination of the fill-level value of the fuel tank. This is achieved advantageously in that the fault memory stores additional operating conditions such as the engine temperature, the rpm and the like of the engine.

BRIEF DESCRIPTION OF THE DRAWINGS

The invention will now be described with reference to the drawing which shows the time-dependent trace of the drive cycles of an internal combustion engine as well as the time-dependent traces of the malfunction, the output of the fault announcement by a warning lamp and the storage in a fault memory.

DESCRIPTION OF THE PREFERRED EMBODIMENTS OF THE INVENTION

The basic idea of the present invention is a method to detect and document exhaust-gas relevant malfunctions of a motor vehicle having an internal combustion engine utilizing on-board diagnosis. Malfunctions are detected by sensor means and are evaluated in a circuit unit in dependence upon a pregiven number of drive cycles and are displayed via a warning lamp. The malfunctions are stored in a fault memory. In the method, fault announcements based on an empty tank are distinguished from fault announcements caused by technical defects. In addition, a fill-level determination of the fuel tank is made and the specific fill-level value is stored. In the method, outputting as well as storage of fault announcements are made in dependence upon the fill level of the fuel tank. In this way, it is possible, by extinguishing the warning lamp and by erasing the fault memory to not only avoid visits to a service facility but also to avoid investigations as to defects which are not present.

The method to detect and document exhaust-gas relevant malfunctions of a motor vehicle having an internal combustion engine with the aid of on-board diagnosis can best be explained in connection with the drawing. This drawing shows the following: the time-dependent trace of drive cycles, a malfunction occurring during these drive cycles and the display of this malfunction by a warning lamp and the storage of this malfunction in a fault memory.

The upper graph (a) shows various drive cycles of a motor vehicle equipped with an internal combustion engine. The drive cycles 1 and 2 take place with an empty tank and a tanking operation takes place between drive cycle 2 and drive cycle 3.

Graphs (b1) to (b3) show a method for detecting and documenting exhaust-gas relevant malfunctions of a motor vehicle with an internal combustion engine utilizing on-board diagnosis and corresponds to the state of the art.

In the upper graph (b1), a malfunction occurs during drive cycles 1 and 2. The malfunction can, for example, be ignition misfires and/or disturbances in the fuel supply system based on an empty tank which no longer occur after the tanking operation between the second and third drive cycles.

As shown in graph (b2), a warning lamp, which signalizes a malfunction of the vehicle, is switched on because a malfunction was detected over two drive cycles. The warning lamp is only switched off after the fifth drive cycle even though the malfunction was no longer present after the second drive cycle because a warning light can only be switched off after three drive cycles in which the fault no longer occurred. This is in accordance with the requirements of the California Environmental Authority (CARB) which corresponds to a method known the state of the art. Simultaneously therewith, the detected malfunction is stored in the fault memory (graph b3) and is only erased after 42 drive cycles because the fault memory can only be erased after 40 drive cycles in which the malfunction did not occur again.

This type of output of the fault announcement as well as the storage of the malfunction has, on the one hand, the disadvantage that the driver of the vehicle goes to a service facility (for example between the fourth and fifth drive cycles) because the warning light glowed continuously. The service facility personnel now reads out the externally readable fault memory and likewise determines the presence of a malfunction which actually is no longer present because it was based on a tank driven to empty. In this way, not only is an unnecessary visit to a service facility initiated but furthermore, a malfunction is stored in the fault memory which no longer is present and the service facility personnel is lead to conduct an unnecessary investigation.

In order to avoid this, the following method is followed as shown in curves (c1) to (c4).

As soon as a malfunction on the basis of a tank driven to empty occurs over two drive cycles (for example, as shown by drive cycles 1 and 2 in the drawing), the warning lamp is switched on and this malfunction is stored in the fault memory. Simultaneously, the fill-level value of the fuel tank is determined and likewise stored in the fault memory. This fill-level value is identified in the drawing as "empty-tank signal". This empty-tank signal shows now a tanking operation between the second and third drive cycle and the output of the fault announcement as well as the storage of the malfunction is eliminated by a circuit unit (for example, via an engine control which is anyway present) in dependence upon the fill-level value of the fuel tank. That is, the warning lamp is switched off and the malfunction stored in the fault memory is erased. In this way, a superfluous visit to the service facility is avoided and, furthermore, the malfunction can be set in relationship to the empty-tank signal at a later inquiry of the fault memory undertaken for diagnosis or maintenance purposes. In this way, the illumination of the warning lamp can be explained so that, because of this additional information, extinguishing the warning lamp after three fault cycles as well as erasing the fault memory after 40 fault cycles are obsolete.

Stated otherwise, the method makes possible a reliable differentiation of detected malfunctions which are based upon a temporarily empty tank and such malfunctions which are based on an actually present and continuously occurring technical defect. The detection of the fill-level determination can take place in an advantageous manner via a fill-level sensor, by the detection of mixture deviations or even by the charging of the fuel tank with pressure and the detection of the trace of the pressure change resulting thereafter.

In addition to storing the empty-tank signal, other operating conditions of the internal combustion engine such as engine temperature, rpm and the like can be stored in an advantageous manner.

It is understood that the foregoing description is that of the preferred embodiments of the invention and that various changes and modifications may be made thereto without departing from the spirit and scope of the invention as defined in the appended claims.

What is claimed is:

1. A method for detecting and documenting exhaust-gas relevant malfunctions of a vehicle having an internal combustion engine and a fuel tank utilizing on-board diagnosis, the vehicle being driven by an operator in successive drive cycles with each two successive drive cycles being separated by a standstill of the vehicle and a shutoff of the engine, the method comprising the steps of:

- detecting malfunctions utilizing sensor means and evaluating said malfunctions in a circuit unit with said malfunctions including those malfunctions which are based on an empty tank;
- storing fault announcements of said malfunctions in a memory in dependence upon a pregiven number of drive cycles;
- determining a fill-level value indicative of the level of fuel in said fuel tank and storing said fill-level value in said memory;
- outputting and storing fault announcements of said malfunctions in said memory in dependence upon said fill-level value thereby eliminating fault announcements of said malfunctions based on an empty tank;
- directly outputting each fault announcement occurring in a drive cycle and storing said fault announcement together with the fill-level value; and,
- ending the output of the fault announcement in a further drive cycle and erasing the memory only when said fill-level value exceeds a pregiven value in said further drive cycle and when said fill-level value had been below said fill-level value in the drive cycle directly preceding said further drive cycle.

2. The method of claim 1, wherein said malfunctions which include at least one of combustion misfires and disturbances in the fuel supply system are detected, displayed and stored in said memory.

3. The method of claim 1, wherein said fill-level value is obtained utilizing a fill-level sensor.

4. The method of claim 1, wherein said fill-level value is obtained by detecting deviations in the mixture supplied to the engine.

5. The method of claim 1, comprising the further steps of determining said fill-level value by charging said fuel tank with pressure; and, detecting a trace of the pressure charge in said tank which occurs after said charge is applied.

6. The method of claim 1, wherein the operating conditions of said engine are stored in said memory and said operating conditions including engine temperature and engine rpm.

7. The method of claim 1, wherein said memory can be read out externally for diagnostic and maintenance purposes.

* * * * *